Sept. 7, 1937.   L. M. JANKO   2,092,214
BATTERY
Original Filed Aug. 1, 1935   3 Sheets-Sheet 1
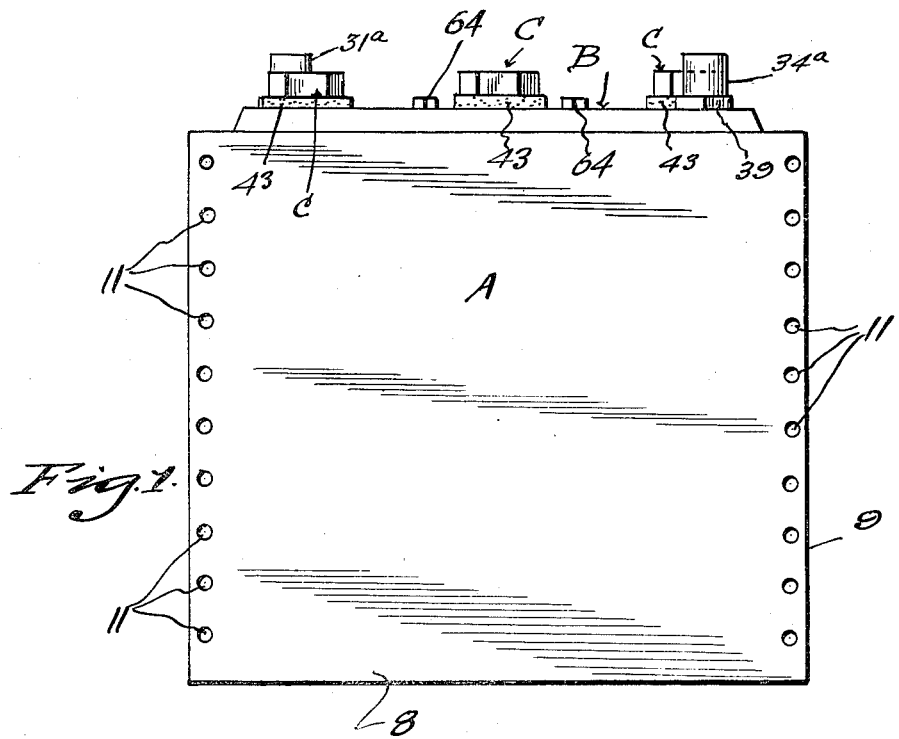
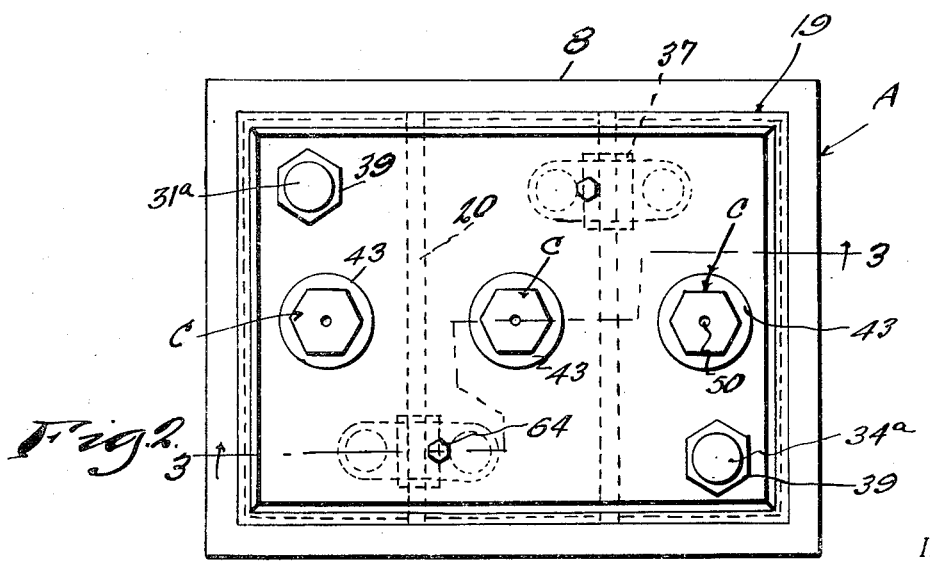
Inventor
Ludwig M. Janko
By Clarence A. O'Brien
Attorney Sept. 7, 1937.   L. M. JANKO   2,092,214
BATTERY
Original Filed Aug. 1, 1935   3 Sheets-Sheet 2

Inventor
Ludwig M. Janko
By Clarence A. O'Brien
Attorney

Sept. 7, 1937.   L. M. JANKO   2,092,214
BATTERY
Original Filed Aug. 1, 1935   3 Sheets—Sheet 3

Inventor
Ludwig M. Janko
By Clarence A. O'Brien
Attorney

Patented Sept. 7, 1937

2,092,214

UNITED STATES PATENT OFFICE 2,092,214

BATTERY

Ludwig Martin Janko, Omaha, Nebr.

Application August 1, 1935, Serial No. 34,267
Renewed May 10, 1937

1 Claim. (Cl. 136—178)

This invention relates to storage batteries.

One of the objects of the invention is to provide a storage battery with a filling cap that provides proper venting action to allow gases to escape and at the same time furnishes a seal to prevent the electrolyte from escaping in event the battery is tilted as often occurs in automobile accidents whereby the unfortunate victims of the accident are often burned and disfigured by the electrolyte.

Another feature of the present invention is to provide an internal construction of the battery that admits of connecting intermediate cells of the battery together without the necessity of having the connection on the outside of the cover thereby eliminating additional openings through which the electrolyte may leak.

Another feature of the present invention is the provision of a cover construction for the battery which allows maximum efficiency in sealing and securing the cover to the battery casing.

Another feature of the present invention is to provide the side and end walls of the battery casing with air pockets to permit the walls to be cooled which promotes maximum efficiency in the charging of the battery by eliminating excess heat during the charging.

Further objects of the invention are to provide a battery of the character referred to that is strong, compact and durable, thoroughly reliable for its intended purpose, and comparatively inexpensive to manufacture.

With the foregoing and other objects in view the invention consists of a novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claim hereunto appended.

In the drawings wherein like reference characters denote corresponding parts throughout the several views:

Figure 1 is a side elevation of the battery in accordance with the present invention.

Figure 2 is a top plan view thereof.

Figure 3:
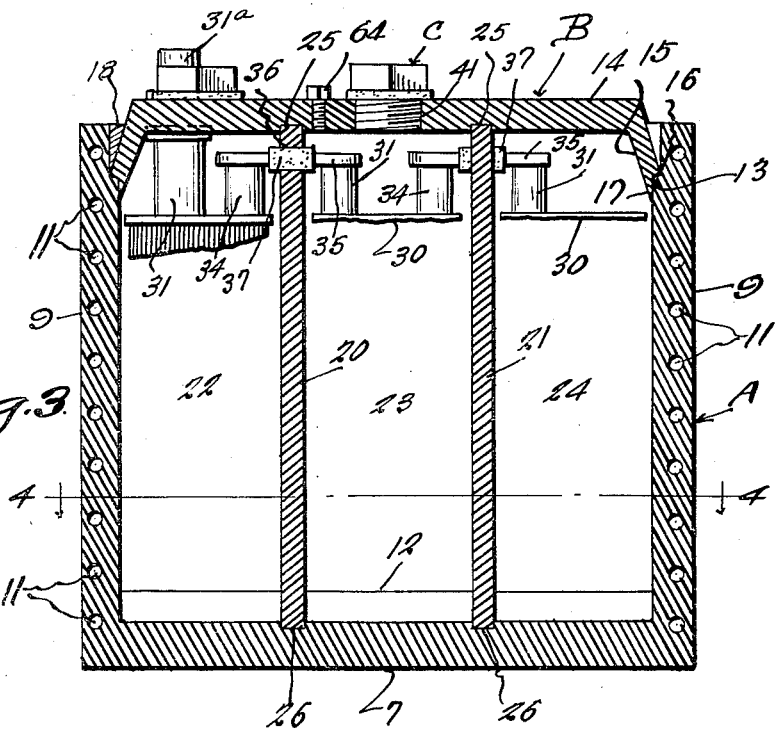
Figure 3 is a detailed vertical section taken on the plane of line 3—3 of Figure 2.
Figure 4:
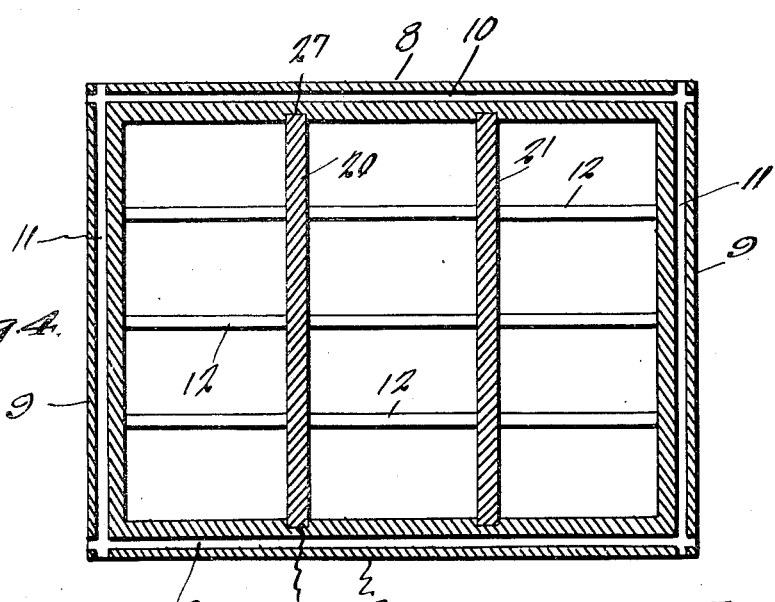
Figure 4 is a horizontal section taken substantially on line 4—4 of Figure 3 and looking in the direction of the arrows.
Figure 5:
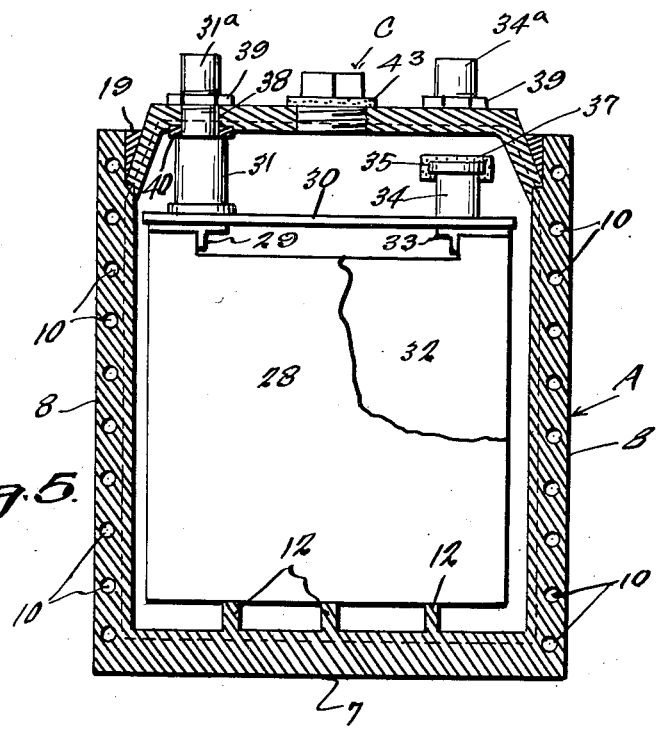
Figure 5 is a detailed vertical section through the battery showing parts broken away.
Figure 6:
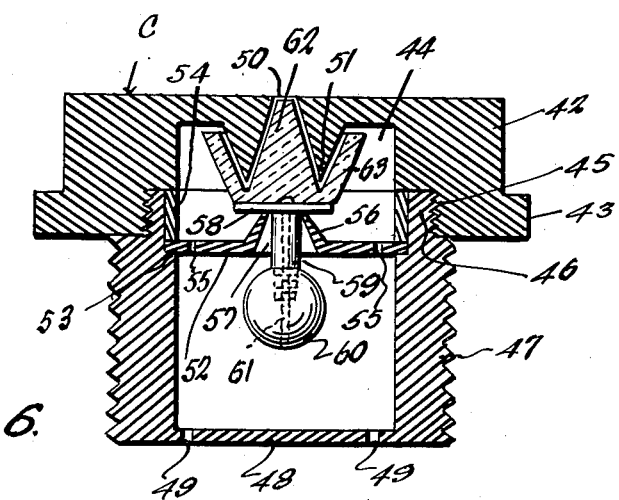
Figure 6 is an enlarged detailed vertical sectional view through the filling cap removed from the battery.

Referring to the drawings in detail, A indicates the battery casing or box formed of any durable acid resisting material suitable for batteries such as hard rubber or the like. The battery casing A is formed with a bottom wall 7 with side walls 8 and end walls 9 rising therefrom. The casing is open at the top. There is a cover B secured over the casing A which provides a seal for the top of the casing. Coextensive with their length, the side walls 8 are formed with parallel, vertically spaced round openings 10 and the end walls 9 are formed with like openings 11. These openings in the side and end walls provide air spaces for cooling the battery casing during charging and recharging operations which increase the temperatures within the battery casing.

Extending longitudinally of the casing, there are upstanding parallel ribs 12 which provide supports for the lower edges of the cell plates and between the ribs are pockets for the reception of sediment.

Around the inside of the casing the end and side walls are formed with a horizontal ledge inset with respect to the inner faces of the walls.

The cover or lid B is formed with a flat horizontal plate 14 from the edge of which extends a depending outwardly declining skirt 15 on the free edge of which is a horizontal shoulder 16 which bears on the ledge 13. Shoulder 16 only occupies a portion of the edge of the skirt 15 and this shoulder merges with a wing 17 which overhangs the walls of the casing below the ledge and forms an efficient joint for the cover or lid B. When the cover B is in position the slant of the outer face of the skirt 15 provides a wedge shaped pocket 18 which receives the battery sealing compound 19 when the cover is sealed in place on the casing.

In the size of the battery used for illustrative purposes herein, the interior of the casing is divided crosswise by two partition walls 20, 21 and these partition walls form the three interior cell chambers 22, 23 and 24. The partition walls 20 and 21 seal the respective chambers from one another. The top edges of the partition walls seat in transverse grooves 25 formed inside the plate 14 and the skirt 15 and the bottom of the partition walls seats in transverse grooves 26 extending across the bottom the ribs 12 being notched in alignment with the grooves to admit the reception of the bottom of the partition walls in the said grooves 26. The side of the partition walls 20 and 21 seat in grooves in the inside of the opposed side walls 8. These grooves are indicated at 27. It will thus be seen that the partition walls 20, 21 prevent the electrolyte contained in the cell chambers 22, 23 and 24 from leaking from one cell to another.

Inside the cell chambers 22, 23 and 24 are arranged the battery plates in the customary grouping. About the battery plates in the chamber is contained the electrolyte which produces the current for the battery by electrolytic action. In each group of battery plates the individual positive plates 28 are connected by the bar 29 carried by an insulation plate 30 and this bar 29 is connected to the positive poles 31 on each group of plates. The negative plates 32 of each group or cell are connected to the bar 33 carried by the insulation plate 30 and the negative terminals 34 are connected to the bar 33. In the arrangement of the present invention it is only necessary to extend the battery terminals of the end cells through the plate 14 of the cover B which terminals form the positive and negative terminal posts to which the conductor cables are fastened. As will appear by referring to Figure 3 of the drawings, the intermediate terminals connecting the positive and negative poles of each cell together is effected by horizontal connecter bars 35 the centers of which extend through openings 36 in the partition walls near the tops thereof. To effect a seal between the chambers there is a hard rubber band 37 vulcanized on the intermediate portion of the connecter bars 35 which conformably fit in the openings in the partition walls. It will be seen that the foregoing construction enables the opposite poles of the cells to be connected together inside the cover B, thereby eliminating openings in the plate 14 of the cover and reducing to a minimum the number of openings to leak. To one corner of the plate 14 extends the negative terminal 34 which forms the negative battery post 34a. Likewise the positive terminal 31 of the opposite end cell extends through the plate 14 of the cover and forms the positive battery post 31a. To the upper projecting free end of the negative post 34a and positive post 31a are connected the conductor cables by which electricity is conveyed from the battery. Each of the posts 34a and 31a are formed in the same manner and a description of one will clearly teach the construction of the other. The upper end of the posts that extend through round openings 38 in the plates 14 is reduced and each post carries a metal nut 39 that clamps against the outer face of the plate 14 about the opening 38. The inner end of the opening 38 is counterbored to receive a round rubber washer 40 vulcanized on the reduced portion of the posts.

Along the center of the plate 14 of the cover B there are three threaded filling openings 41 one for each cell chamber. Mounted in the filling openings 41 are the filling caps indicated generally at C. Each cap when removed allows the electrolyte to be replenished with water and at the same time their construction provides for venting the hydrogen gas generated during the action of the battery. Cap C consists of a horizontal crown portion 42 having a flange 43 on its lower end that bears flush on the outer face of plate 14 to make a tight joint. This flange 43 may be of relatively soft rubber vulcanized to the harder rubber of the crown. On the inside of the crown 42 is a circular pocket 44 which merges on the bottom of the crown with a threaded counter bore 45 and in the counter bore is threadedly mounted a reduced neck 46 on the externally threaded sleeve 47 which sleeve depends from the crown 42. The threaded outer periphery of the sleeve 47 threads into the filling openings 41 in the plate 14. The lower end of sleeve 47 is closed by a horizontal bridge wall 48 which is provided with spaced venting apertures 49. From the top of the crown 42 there extends an opening 50 which registers with the upper end of pocket 44 in the crown. The walls of the crown surrounding the opening 15 describe a frusto-conical shape.

The wide end of the opening 50 in the chamber 44 is surrounded by a lip 51, the outer face of the lip inclining upwardly and outwardly. Across an intermediate portion of the sleeve 47 is a disk 52 which bridges the diameter of the sleeve and the edge of the disk rests on a shoulder 53. To clamp the disk in position there is a ring 54 disposed edgewise in the recess formed by the shoulder 53 and the upper end of the ring bears against the crown 42. To assemble the disk 52 the reduced neck 46 is made separable from the crown. In the margin of the disk 52 are venting openings 55. In the center of the disk 52 is an upstanding rest 56 which is hollow and open at the upper end. The walls of the rest incline upwardly and inwardly. Through the rest 56 extends a pocket 57 which forms a communication on the interior of the sleeve to the pocket 44 in the crown.

Supported on the upper free edge of the rest 56 is a disk plate 58. From the center of the plate 58 depends a round shank 59 the lower end of which is threadably engaged with a ball 60. The shank and ball are preferably formed of glass. Through the shank 59 and ball 60 there is an opening 61. In event the battery will be tipped over or the automobile carrying the battery should be turned over the ball 60 will swing like a pendulum in the sleeve 47 rocking the disk plate 58 attached to the shank 59. Resting freely on the plate 58 is a frusto-conical plug valve 62 having the walls thereof substantially conforming in shape to the walls of the opening 50. Around the base of the plug valve 62 is an upstanding flange 63 which substantially conforms in shape with the inclined outer face of the lip 51. When the battery is in an upright position there is sufficient space between the walls of the opening 50 and the lip 51 to allow hydrogen gas to escape out of the opening 50. However, should the battery be tipped over the rocking of the plate 58 on which the plug rests will cause the plug 62 and flange 53 to seal against the walls of the opening and the walls of the lip preventing the electrolyte from escaping from the cells. The plug valve 62 and the flange 63 are preferably formed of glass.

So as to provide an opening in the area of the connecter straps 35 there is a screw plug 64 mounted in the plate 14 of the cover. Through the opening in which the plug is mounted the various cells may be tested and furthermore should it be necessary to dismantle the battery steam may be applied through the openings to loosen the sealing compound so that the cover B may be removed.

Having thus described the invention, what is claimed as new is:

A plug for secondary batteries comprising a cap of hollow construction and provided with internal threads, a depending member provided with external threads for engagement to a storage battery case and also into the cap, a partition interposed between the cap and the depending member and provided with an upwardly converging member thereon, a plate rockably supported by said upwardly converging structure, said plate being provided with a depending shank provided with a weight at its lower end, said depending member being hollow and provided with a perforated bottom, said cap having a downwardly flaring opening therein, a depending formation on the inside of the cap through which the opening is formed, a body supported by the plate, said body being of conical shape for engagement into the flaring opening, said body being provided with upwardly flaring side walls for engagement over the depending formation on the cap.

LUDWIG M. JANKO.